United States Patent [19]
Chess et al.

[11] Patent Number: 5,802,592
[45] Date of Patent: Sep. 1, 1998

[54] SYSTEM AND METHOD FOR PROTECTING INTEGRITY OF ALTERABLE ROM USING DIGITAL SIGNATURES

[75] Inventors: David M. Chess, Mohegan Lake; Gregory Bret Sorkin; Steve Richard White, both of New York, all of N.Y.

[73] Assignee: International Business Machines Corporation, Armonk, N.Y.

[21] Appl. No.: 656,626

[22] Filed: May 31, 1996

[51] Int. Cl.[6] .................... G06F 12/14; G06F 12/16; G06F 11/30

[52] U.S. Cl. ............. 711/164; 711/102; 711/103; 395/183.12; 395/183.14; 395/183.21; 395/652; 395/633

[58] Field of Search .................. 711/102, 163, 711/103, 164; 395/651–653, 186, 188.01, 183.09, 183.12, 183.14, 183.21

[56] References Cited

U.S. PATENT DOCUMENTS

| | | | |
|---|---|---|---|
| 5,327,531 | 7/1994 | Bealkowski et al. | 395/182.04 |
| 5,379,342 | 1/1995 | Arnold et al. | 380/2 |
| 5,396,558 | 3/1995 | Ishiguro et al. | 380/25 |
| 5,522,076 | 5/1996 | Dewa et al. | 395/652 |
| 5,579,522 | 11/1996 | Christeson et al. | 395/652 |
| 5,634,079 | 5/1997 | Buxton | 395/892 |

FOREIGN PATENT DOCUMENTS

| | | |
|---|---|---|
| 0 515 760 A1 | 12/1992 | European Pat. Off. |
| 0 588 339 A2 | 3/1994 | European Pat. Off. |

OTHER PUBLICATIONS

Aarons et al., Security strategies: hardware protection for PCs, PC Magazine, v6, p. 104(12), Apr. 28, 1987.

Rosch, Internal Security: The Growing Mass of Stored PC Data Makes Protecting It a Modern Necessity, PC Week, v2, n18, pp. 89–91, May 7, 1985.

Clark et al., BITS: A smartcard protected operating system, Communications of the ACM, v37, n11, pp. 66–70, Nov. 1994.

*Primary Examiner*—Eddie P. Chan
*Assistant Examiner*—Reginald G. Bragdon
*Attorney, Agent, or Firm*—Perman & Green, LLP

[57] ABSTRACT

A system and method for verifying the integrity of a computer system's BIOS programs stored in alterable read only memory (such as FLASH ROM), and preventing malicious alteration thereof. The system and method regularly check the contents of the alterable read only memory using a digital signature encrypted by means of an asymmetrical key cryptosystem.

28 Claims, 3 Drawing Sheets

SYSTEM AND METHOD FOR PROTECTING INTEGRITY OF ALTERABLE ROM USING DIGITAL SIGNATURES

FIELD OF THE INVENTION

The invention relates to the protection of the integrity of computer system basic input-output systems.

BACKGROUND OF THE INVENTION

Modern general-purpose computers contain programs stored in non-volatile read-only memory (ROM) which are used to "bootstrap" the system when power is turned on, and to provide basic low-level access to the hardware. These programs generally perform various tests for proper functioning of the system hardware at power-on and then locate, load and transfer control to the operating system bootstrap code. They also provide a standard interface (sometimes called the basic Input/Output System, or BIOS) to the functions of the hardware.

While such system ROMs were originally of the permanently "burned-in" variety, which can be changed only by physically replacing a microchip, advances in technology have recently made it possible to utilize alterable, or "FLASH" ROM instead. The advantage of alterable ROM is that its contents can be altered by software, making ROM updates significantly simpler. As alterable ROM technology advances, and as systems become more complex, requiring more frequent ROM updates, the use of FLASH for this purpose is quickly becoming more common.

While software-alterable ROM has definite advantages, it also has dangers; since the ROM is the basic software that controls the startup and low-level operation of the system, if it becomes corrupted (accidently or maliciously), the integrity of the system as a whole can be compromised, and it can be very difficult either to detect the corruption or to repair it.

There are well-known methods of verifying the integrity of the contents of ROMs (FLASH and otherwise) by performing a simple checksum, to ensure that, to a very high probability, no accidental changes have been made to the contents of the ROM. The techniques used to do this verification are typically a simple additive checksum or a cyclic redundancy check: these techniques are designed to be simple and fast, while having a high probability of detecting typical accidental or defect-caused changes to ROM. They are, however, easily "invertible" ; that is, given the current contents of ROM and the current value of the checksum, an attacker desiring to make intentional changes to the ROM without modifying the checksum would be able to do so with little difficulty.

A further feature of many current systems is that they allow the user to access the built-in programs stored in ROM for examining and altering system configuration settings. This typically is accomplished by starting the system from a special diskette, or pressing a combination of keys during system setup. But the configuration programs, and the programs that decide whether or not to pass control to them, are themselves alterable ROM (on machines that have alterable ROM), and therefore could become corrupted.

SUMMARY OF THE INVENTION

The current invention functions in a component of a computing system containing alterable ROM to verify that the alterable ROM has not been changed, or that a proposed update to the alterable ROM is legitimate. This verification is performed by use of a digital signature, the signature having the characteristic that it is not easily invertible: even an attacker with full knowledge of the code used to verify the digital signature, and with the ability to alter the current contents of the ROM and the current signature, would have to perform a prohibitive amount of computation to generate a new content/signature pair that would pass the test.

The manufacturer, on the other hand, by virtue of having access to a secret piece of data (for example, the private key in an asymmetrical-key cryptosystem), is able to produce signatures for new versions of the contents of alterable ROM very easily.

DETAILED DESCRIPTION OF THE PREFERRED EMBODIMENTS

Figure 1:
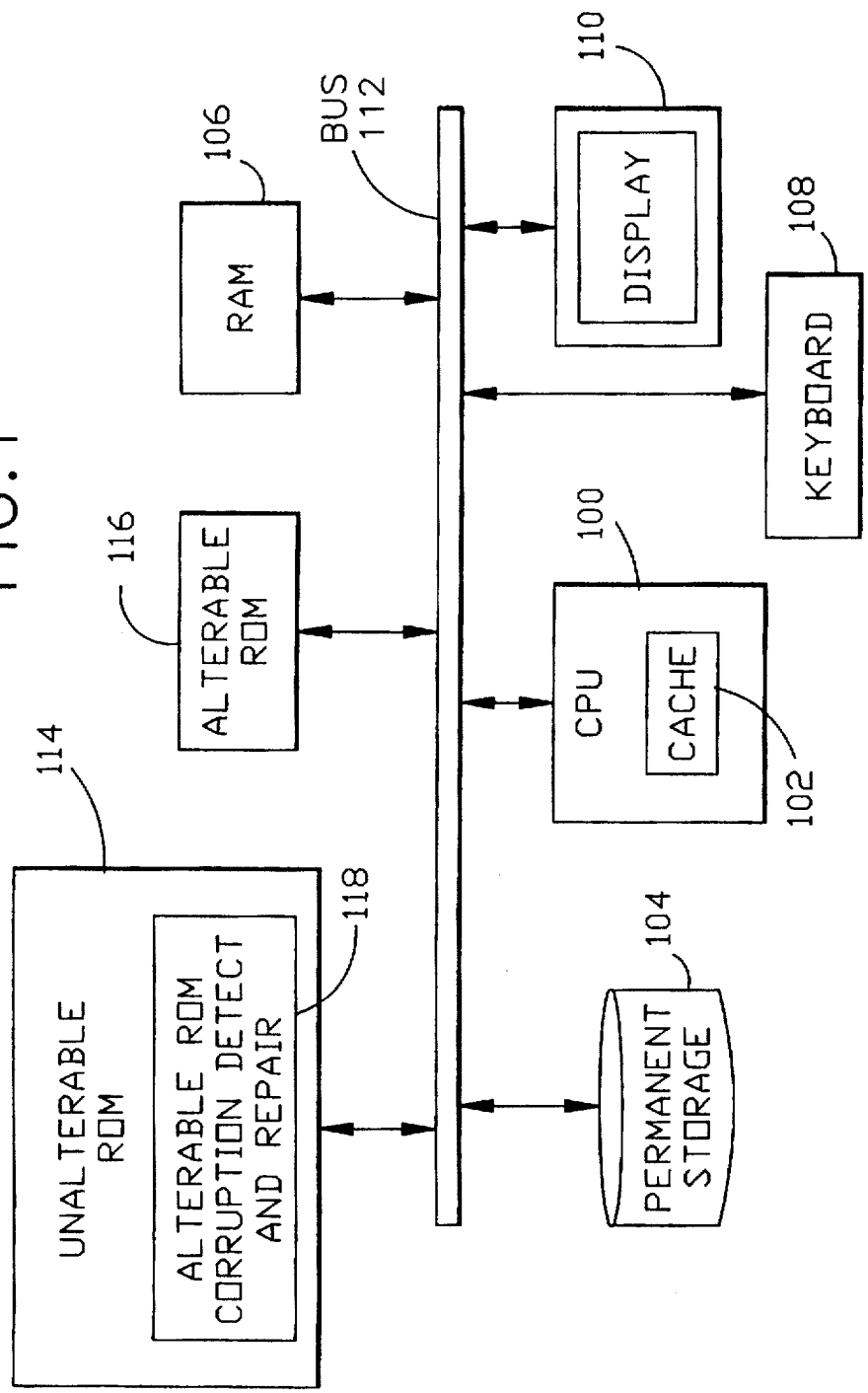
FIG. 1 is a system in accordance with the invention.

FIG. 1 is a block diagram of a system in accordance with the present invention.

The system includes a CPU 100 with optional cache memory 102, a permanent storage device 104, such as a hard disk drive, random access memory 106, an input device such as keyboard 108, and an output device, such as display 110. The system components are connected via bus 112.

The system further comprises an unalterable ROM 114, which stores various programs used to bootstrap the system at startup and provide basic low level system hardware access. Also provided is an alterable ROM 116, such as a FLASH ROM, which stores additional bootstrapping and hardware access programs. The programs in the ROMs 114 and 116 together constitute first and second portions of a general bootstrap program.

Also provided in accordance with the invention is an alterable ROM corruption detect and repair means 118. The means 118 can be implemented as software running in unalterable ROM 114. Means 118 operates as described with respect to FIGS. 2 and 3 to detect unauthorized modifications to the alterable ROM 116, and also either to restore the alterable ROM to its uncorrupted state, or to make authorized changes to the alterable ROM. Means 118 can either constitute part of unalterable ROM 114, or reside in a separate hardware or software location in the system.

In one embodiment of the invention, a system bootstrap routine is stored in unalterable ROM 114, the routine performing, when called, a signature computation on the current contents of the alterable ROM 116 and the current signature (stored in ROM 114 or elsewhere), and then passes control to the bootstrap code in the ROM 116 only if the signature is validated. Defect-caused or malicious changes to the FLASH ROM would therefore prevent the system from starting up correctly at the next power-on. The system could also be configured so that an attempt to update ROM 116 will cause an immediate restart from unalterable ROM 114, immediately revealing a corrupted update. More complex implementations involve a secure-update module that guarantees (for example by monitoring instruction fetches using methods known to the art) that ROM 116 updates could be done only by code running from the ROM 116 itself, and each version of the alterable ROM could contain signature-checking code, and reject any attempted update that did not meet a signature test.

A means for correcting alterable ROM 116, in the event that it becomes corrupted, is also provided in accordance with the invention. The first programs to run when the system is started are entirely in unalterable ROMS; the first thing these programs do is check for a signal from the user that the alterable ROM 116 should be bypassed. If the signal is present, the first programs transfer control to other programs, also stored in unalterable ROM, that allow the user to examine and optionally replace the contents of the alterable ROM 116; in doing this, they do not run any code from the alterable ROM, and they will work correctly even if the alterable ROM has become corrupted. If the signal from the user is not found, control passes to the normal system startup programs stored in alterable ROM 116.

In one implementation of this invention, the unalterable ROM 114 is placed at the top of the memory space of a PC-compatible system, such as the one shown in FIG. 1. When the system is first started, control passes to a small program in the unalterable ROM. This program checks to see if both control keys are being held down; if they are not, it passes control to the normal system-startup entry point stored in the alterable ROM 116, which is located just below the unalterable ROM in the memory space. If the special key combination is being pressed, the program loads the first sector from the diskette in the A: drive, using a minimal diskette-input routine built into the unalterable ROM, and then passes control to it. The program on the diskette can then use the minimal unalterable diskette-input routine to read in the rest of itself, and then perform whatever user interaction is necessary to examine, verify, and if necessary, replace the contents of the alterable ROM.

In other possible implementations, the unalterable ROM could itself contain all the programming needed to interact with the user to examine and replace the contents of the alterable ROM. Many other signals from the user are also possible besides a specific key-combination; the unalterable ROM could check for a certain byte at a certain offset in the first sector of the diskette in the A: drive, or for the presence of a certain signal in the serial or parallel input port on the system, or for the position of a special switch added to the system for this purpose.

Another possible implementation would involve a section of protected code that would verify the alterable ROM at intervals during normal operation of the computer, by putting the code in a non-interceptable service routine that would get called whenever a timer-tic occurred, or whenever a disk was accessed (for instance), and warn the user if the signature check failed.

In any implementation of this invention, the code doing the signature calculation could ignore any desired part of the alterable ROM being checked, to allow for the saving of variable data in the alterable ROM (only code parts, and data parts that should not be subject to unauthorized update, need be checked.)

In all these cases, the manufacturer of the system would be able to provide correctly-signed alterable ROM updates (by virtue of holding the secret half of the asymmetric keypair used to generate and check digital signatures), but anyone else attempting to install an alterable ROM update would be unable to correctly do so without prohibitive amounts of computation (the exact amount of computation needed, and the speed of the signature check itself, would depend on the digital signature algorithm chosen, many of which are in the art).

A vulnerability of some implementations of this invention is that if the secret key of a key-pair is ever divulged, an attacker would be able to make unauthorized alterable ROM modifications on machines which use that key-pair for verification. To minimize the impact of this, a manufacturer could use a different key-pair for different subsets of the systems protected: depending on the needs of the specific situation, each machine model, or each submodel, could use a different key-pair. For greater security, at a cost of some convenience, the subsets could be made as small as desired. For instance, if the keypair were changed every few thousand machines manufactured, the publication of one secret key would expose only a few thousand machines to unauthorized modification; on the other hand, in order to install a legitimate update, the user would first have to determine which subset his machine's serial number corresponds to, and obtain the update tailored for that subset. In the extreme case, a different key-pair could be used for each machine: this involves more effort and more bookkeeping, but if one secret key is divulged, only one machine is compromised (only that single machine may have its alterable ROM contents altered without detection).

To protect against exposure of a private key, it might also be desirable to have a mechanism for updating the public key used for verification. For instance, a system might be designed so that, if it were determined that the private key protecting it has been exposed, a new public key could be installed by a special update process or by physically replacing a chip.

Figure 2:
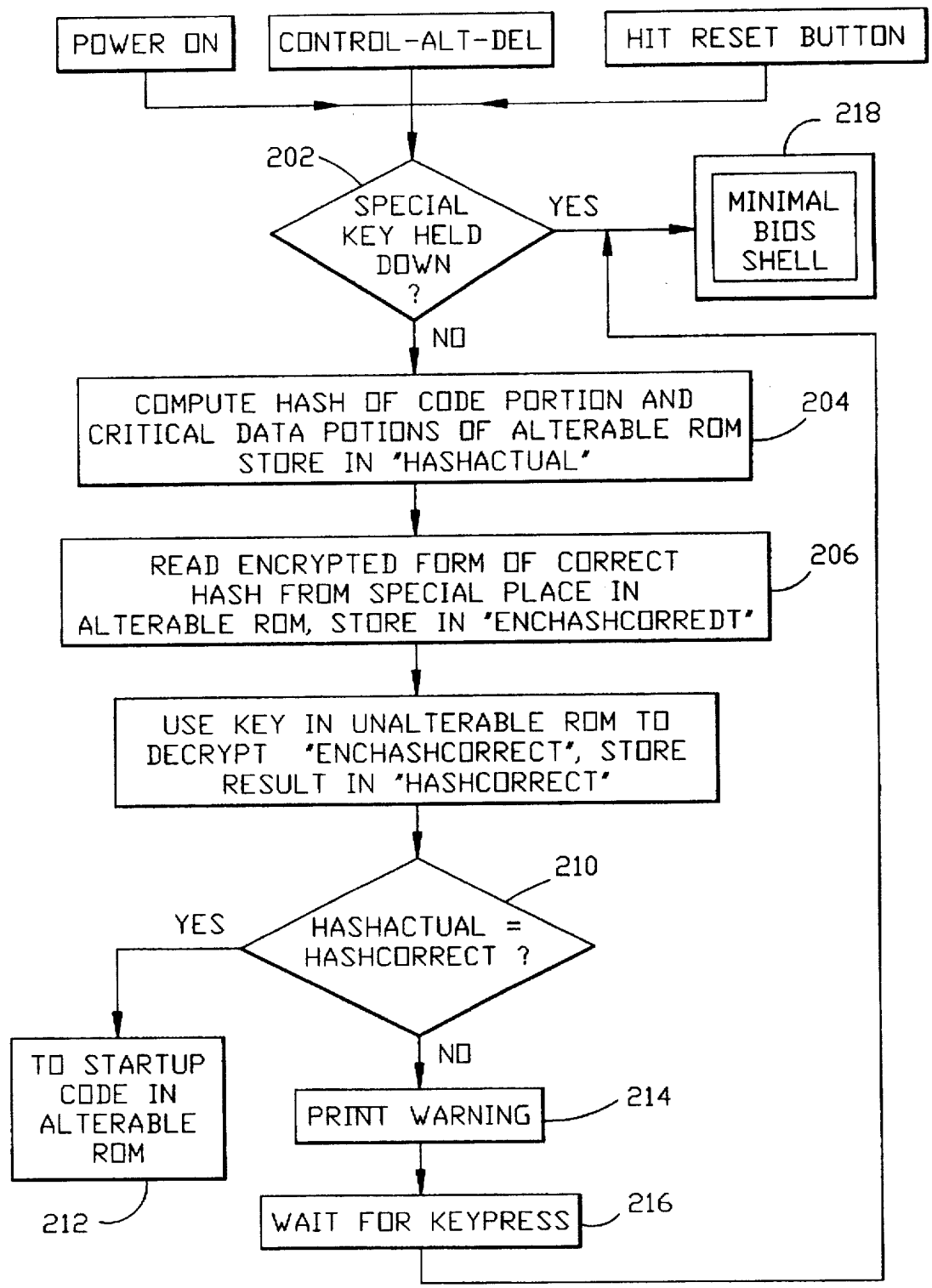
FIG. 2 is a flow diagram describing a method for checking the integrity of an alterable ROM, in accordance with one aspect of the invention.
Figure 3:
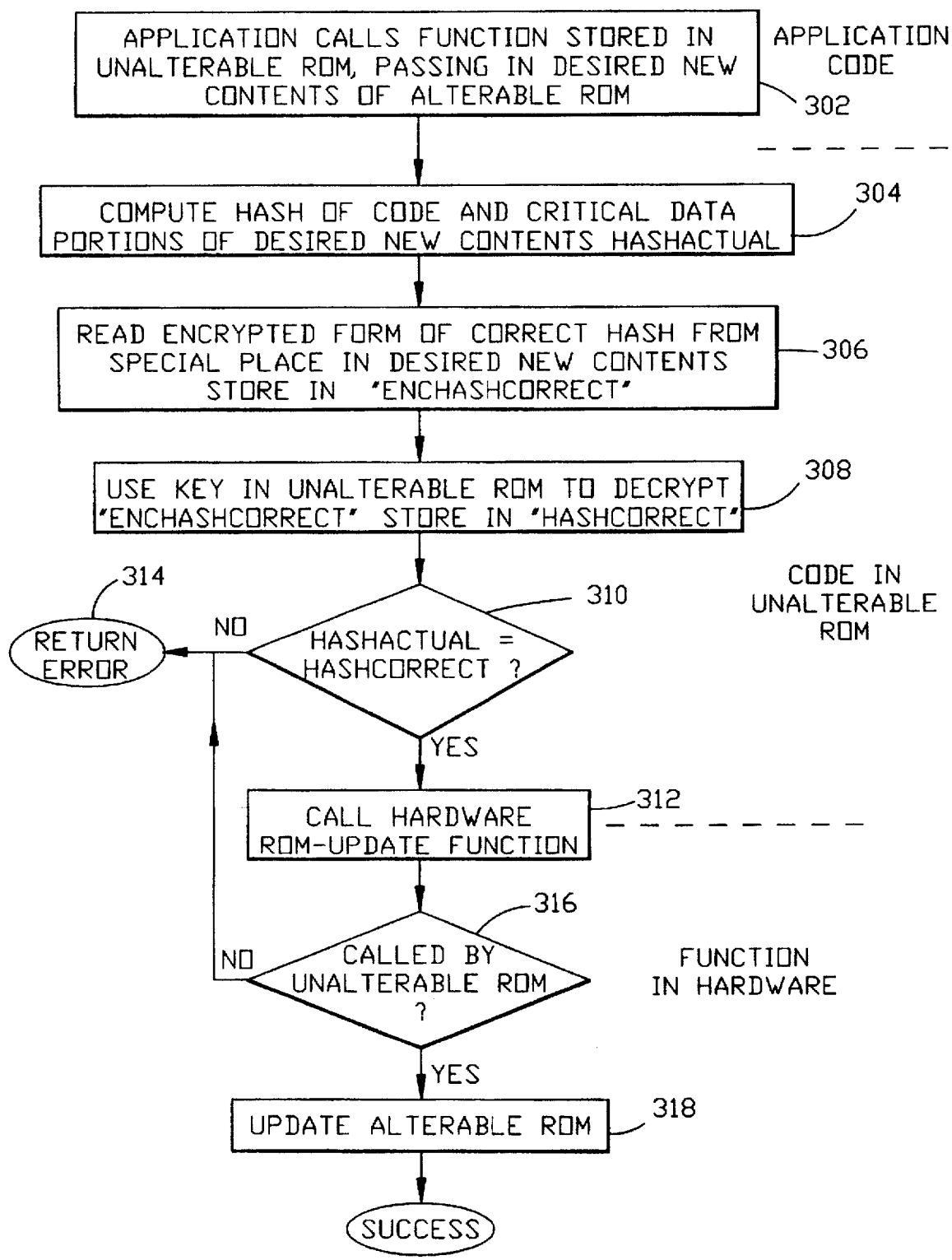
FIG. 3 is a flow diagram describing a method for updating or restoring the contents of an alterable ROM in accordance with a further aspect of the invention.

The methods by which the foregoing functions of the system are accomplished are described in detail with respect to FIGS. 2 and 3.

During the initial setup of the machines at the manufacturer, the manufacturing process includes the following steps:

For each group of some number of machines (for example, 40,000), a new public key/private key pair is selected for use in an asymmetric cryptosystem, such as RSA. The private key is stored securely at the manufacturer, and the public key is burned into the unalterable ROM 114.

After loading the initial contents of the alterable ROM 116, the manufacturer computes a cryptographic hash (such as MD5) of the code portions and critical data portions of the contents, encrypts the hash value using the private_key, and stores the encrypted value as a signature at a fixed location in the alterable ROM.

The reason for using the asymmetric cryptosystem in addition to the cryptographic hash is that then anyone possessing the public key can verify a ROM/hash pair, but only the manufacturer, possessing the private key, can generate a valid pair.

Referring to FIG. 2, when a protected system is booted, either from power-up or any other form of system reset, control passes to code in the non-alterable ROM. That code performs the following steps (use of the "Escape" key in the following steps is, of course, just one example of a possible means for triggering a boot to the Minimal BIOS):

If the Escape key on the keyboard is being held down (step 202), immediately transfer control to the Minimal BIOS, stored in unalterable ROM 114 (the minimal BIOS is a program or set of programs residing in the unalterable ROM, and is described below), without executing any programs in the alterable ROM 218. Otherwise, continue.

Compute a cryptographic hash of the code portions and critical data portions of the contents of the alterable ROM, using the same algorithm (e.g., MD5) that was used at initial alterable ROM load time (step 204), and store the result as "HashActual".

Retrieve the encrypted form of the original hash value from the alterable ROM and store it as "EncHashCorrect"(step 206), and decrypt it using the public key stored in unalterable ROM, to obtain the original stored hash value (step 208). Store the decrypted result as "HashCorrect".

Compare the two hash values HashActual and HashCorrect (step 210). If they match, pass control to the alterable ROM startup routine (step 212).

If the two hash values do not match, print a warning message on the display (step 214), wait for a keypress (step 216), and transfer control to the Minimal BIOS in the unalterable ROM (step 218).

When the manufacturer wants to create an update to the bootstrap programs and data in the alterable ROM, it generates an update file for each of the different private keys. To create the update file for a program protected by a given private key, the manufacturer:

Retrieves the private key for that program from secure storage.

Computes the cryptographic hash of the code portions and critical data portions of the alterable ROM contents, encrypts the result with the private key, and stores the encrypted value at the reserved offset in the alterable ROM image (i.e., a software image of the alterable ROM's contents).

Referring now to FIG. 3, when it is desired to update the contents of the alterable ROM using the FLASH ROM image, it calls a special BIOS function in the unalterable ROM (step 302), which performs the following steps:

Compute a cryptographic hash of the code portions and critical data portions of the requested new contents of the alterable ROM and store as "HashActual", using the same algorithm as used in the previous steps (e.g., MD5) (step 304).

Retrieve the encrypted form of the stored hash value (i.e., the encrypted signature) from the appropriate place in the requested new contents of the alterable ROM, store it as "EncHashCorrect"(step 306), and decrypt it using the public key stored in unalterable ROM to obtain the correct stored hash value (signature) (step 308). Store as "HashCorrect".

Compare HashActual and HashCorrect (step 310). If they match, execute the proper instructions to tell the hardware to update the contents of the alterable ROM (step 318). The hardware, using methods known to the art, will only carry out the request if it came from the correct place in the unalterable ROM (step 316).

If the two hash values do not match (step 310) hardware detects that the update request did not come from the proper place in the unalterable ROM (step 316), the update fails, and the alterable ROM is unchanged. The BIOS, or even the lower-level hardware, could provide the user with a visual or audible warning when this occurs (step 314).

The Minimal BIOS referred to above can, for example, carry out the following functions (at no time does it execute any code from the alterable ROM):

Perform minimal functional tests of some parts of the system, including the diskette drive, display, and keyboard.

Interact with the user via the display and keyboard, allowing the user to perform a small set of functions, including:

Getting help on the Minimal BIOS functions,

Performing a alterable ROM update from an image file on diskette (using the alterable ROM update process described above), Loading a more complete shell program from diskette, and passing control to it, Passing control directly to the alterable ROM, even though it may have failed the integrity check, Rebooting the system normally.

While the invention has been described in particular with respect to preferred embodiments, it will be recognized by those skilled in the art that modifications to the described embodiments can be effected without departing from the spirit and scope of the invention.

We claim:

1. A system, comprising:

a processor;

a storage device storing an operating system program for execution on the processor;

an alterable read only memory for storing data; and a corruption detection device for detecting unauthorized changes to data in the alterable read only memory, the corruption detection device reading a signature, encrypted with a private key, that represents a non-corrupted version of data in the alterable read only memory, and further reading, from a secure memory location, a public key for decrypting the signature, the corruption detection device operating to compare the decrypted using public key, signature to a computed signature for detecting an occurrence of an unauthorized change to the data in the alterable read only memory.

2. The system of claim 1, further comprising: an unalterable read only memory for storing the public key and for storing a first portion of a bootstrap program for controlling the system during a system initialization and subsequently transferring control of the system to the operating system.

3. The system of claim 2, wherein the data stored in the alterable read only memory comprises a second portion of the bootstrap program.

4. The system of claim 3, further comprising means for validly altering the second portion of the bootstrap program.

5. The system of claim 4, wherein the means for validly altering comprises means for:

computing a hash of data constituting a proposed alteration;

reading an encrypted form of a signature representing the data constituting the proposed alteration;

decrypting the signature representing the data constituting the proposed alteration using the public key;

comparing the hash and the decrypted signature and if they match, writing the data constituting the proposed alteration to the second portion of the bootstrap program.

6. The system of claim 5, wherein the means for validly altering comprises a computer program stored in the unalterable read only memory.

7. The system of claim 3, wherein the corruption detection device comprises means, responsive to a triggering event, for:

computing a hash of the second portion of the bootstrap program;

reading the encrypted form of the signature and the public key from their storage locations;

decrypting the encrypted form of the signature using the public key; and comparing the decrypted signature with the hash.

8. The system of claim 7, further comprising means, if the decrypted signature matches the hash, for transferring control from the first portion of the bootstrapping program to the second portion of the bootstrapping program.

9. The system of claim 8, wherein the triggering event is a power-up of the system.

10. The system of claim 8, wherein the triggering event is the actuation of a system reset switch.

11. The system of claim 8, wherein the triggering event is the actuation of a combination of keys on a keyboard coupled to the processor.

12. The system of claim 1, wherein the alterable read only memory is a FLASH ROM.

13. The system of claim 1, further comprising means for actuating the corruption detection device periodically while the system is in operation.

14. The system of claim 1, further comprising means for replacing the public key with a new authorized public key.

15. A method, comprising the steps of:

storing data in an alterable read only memory of a computer system;

storing in a first memory location in the system an encrypted signature representing a valid copy of the data in the alterable read only memory;

storing in a second memory location in the system a public key to the encrypted signature;

in response to a triggering event, computing a current signature for the data stored in the alterable read only memory, decrypting the signature representing the valid copy using the public key, and comparing the decrypted signature and the current signature to determine the validity of the data stored in the alterable read only memory.

16. The method of claim 15, wherein the alterable read only memory is a FLASH ROM.

17. The method of claim 15, wherein the triggering event is a power up of the computer system.

18. The method of claim 15, wherein the triggering event is the actuation of a system reset switch.

19. The method of claim 15, wherein the triggering event is the actuation of a combination of keys on a keyboard coupled to the system.

20. The method of claim 15, further comprising a step of storing a first portion of a system bootstrapping program in an unalterable read only memory; and wherein the data stored in the alterable read only memory comprises a second portion of the system bootstrapping code.

21. The method of claim 20, wherein the steps of computing a current signature, decrypting the signature and comparing the decrypted signature and the current signature are performed while the system is under the control of the first portion of the system bootstrapping program.

22. The method of claim 21, further comprising, if the data in the alterable read only memory are valid, passing control of the system from the first portion of the bootstrapping program to the second portion of the bootstrapping program.

23. The method of claim 20, further comprising a step of replacing data in the alterable read only memory with valid replacement data.

24. The method of claim 23, further comprising a step of determining whether a group of candidate replacement data is valid replacement data by:

computing a hash of the data constituting the candidate replacement data;

decrypting an encrypted signature representing the data constituting the candidate replacement data;

comparing the hash and the decrypted signature, and if they match, designating the candidate replacement data as valid replacement data.

25. The method of claim 20, wherein the first and second memory locations are in the unalterable read only memory.

26. The method of claim 15, wherein the triggering event is executed periodically during operation of the system.

27. A method for operating a data processing system, comprising steps of:

partitioning a bootstrap program between an unalterable read only memory device and an alterable memory device;

storing, in the alterable memory device, private key encrypted validity data representing a portion of the bootstrap program stored in the alterable memory device;

storing, in the unalterable read only memory device, a public key for decrypting the private key encrypted validity data;

in response to a triggering event, executing a portion of the bootstrap program stored in the unalterable read only memory device, the executed portion of the bootstrap program first computing validity data for at least some of the content of the alterable memory device, then using the stored public key to decrypt the private key encrypted validity data, and then comparing the decrypted validity data to the computed validity data; and transferring control of the bootstrap program from the portion stored in the unalterable read only memory device to the portion stored in the alterable memory device only if the result of the comparison indicates that no unauthorized modifications have been made to the content of the alterable memory device.

28. A method as in claim 27, wherein the alterable memory device is a FLASH ROM.

* * * * *